(12) United States Patent
Cho et al.

(10) Patent No.: US 12,535,629 B2
(45) Date of Patent: Jan. 27, 2026

(54) 3-DIMENSIONAL RESONANT STRUCTURE BASED INFRARED SELECTIVE EMITTER CAPABLE OF BROADBAND AND INCREASED EMISSION

(71) Applicant: Industry-Academic Cooperation Foundation, YONSEI UNIVERSITY, Seoul (KR)

(72) Inventors: Hyung Hee Cho, Seoul (KR); Nam Kyu Lee, Siheung-si (KR); Joon-Soo Lim, Gyeongsan-si (KR); In Joong Chang, Seoul (KR); Ju Yeong Nam, Seoul (KR); Hyung Mo Bae, Seoul (KR); Ji Hyeok Kim, Daejeon (KR)

(73) Assignee: Industry-Academic Cooperation Foundation, YONSEI UNIVERSITY, Seoul (KR)

( * ) Notice: Subject to any disclaimer, the term of this patent is extended or adjusted under 35 U.S.C. 154(b) by 384 days.

(21) Appl. No.: 18/295,914

(22) Filed: Apr. 5, 2023

(65) Prior Publication Data

US 2023/0314677 A1    Oct. 5, 2023

(30) Foreign Application Priority Data

Apr. 5, 2022    (KR) .................. 10-2022-0042101

(51) Int. Cl.
*G02B 5/28*    (2006.01)

(52) U.S. Cl.
CPC .................. *G02B 5/281* (2013.01)

(58) Field of Classification Search
CPC .......... G02B 5/281; G02B 1/002; H10F 77/00
See application file for complete search history.

(56) References Cited

U.S. PATENT DOCUMENTS

| 4,690,750 A | * | 9/1987 | Roxlo | ....................... C07C 7/12 |
| | | | | 55/423 |
| 2017/0338567 A1 | * | 11/2017 | Puscasu | .................. G01J 5/024 |

FOREIGN PATENT DOCUMENTS

CN    105762532 A    *    7/2016    ............. H01Q 17/00

OTHER PUBLICATIONS

Li, Yulian, et al. "Two broad absorption bands in infrared atmosphere transparent windows by trapezoid multilayered grating." Optical Materials Express 10.2 (2020): 682-692. (Year: 2020).*

* cited by examiner

*Primary Examiner* — Edwin C Gunberg
*Assistant Examiner* — Richard O Toohey
(74) *Attorney, Agent, or Firm* — Bridgeway IP Law Group, PLLC; Jihun Kim

(57) ABSTRACT

Proposed is a 3-dimensional resonant structure-based infrared selective emitter capable of maximizing the infrared selective radiation function by broadening the emissivity in the non-detection bands with resonance phenomena between multiple resonator units at the same time as securing infrared camouflage and energy dissipation-resultant surface thermal stability by reducing the emissivity significantly in the infrared detection band and selectively dissipating energy to the non-detection bands.

12 Claims, 8 Drawing Sheets

| STRUCTURE | SINGLE DIAMETER-BASED INFRARED SELECTIVE EMITTER | | 3-DIMENSIONAL RESONANT STRUCTURE-BASED INFRARED SELECTIVE EMITTER | |
|---|---|---|---|---|
| | Au pattern-ZnS-Au mirror (P = 3 μm, D = 1.6 μm) | | Au pattern-ZnS pattern -Au pattern-ZnS-Au mirror (P = 3 μm, D = 1.3 μm, $D_2$ = 1.5 μm, 2 stack) | |
| SURFACE TEMPERATURE [K] | Emissive power [W/m$^2$·sr] | HEAT DISSIPATION RATE PER UNIT OF BLACKBODY [%] | Emissive power [W/m$^2$·sr] | HEAT DISSIPATION RATE PER UNIT OF BLACKBODY [%] |
| 200 | 0.3 | 17.25 | 1.1 | 63.48 |
| 300 | 6 | 25.20 | 37 | 63.88 |
| 400 | 112 | 30.86 | 226 | 62.12 |
| 500 | 392 | 34.65 | 683 | 60.35 |
| 1000 | 5,334 | 42.29 | 7,025 | 55.68 |

FIG. 6

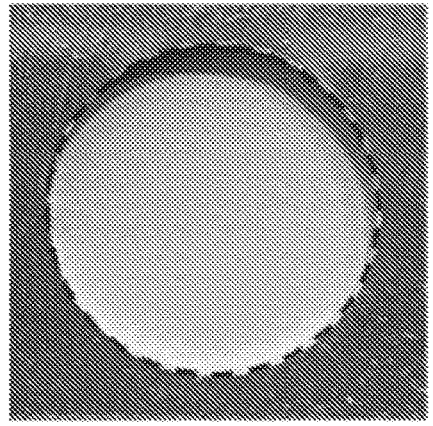
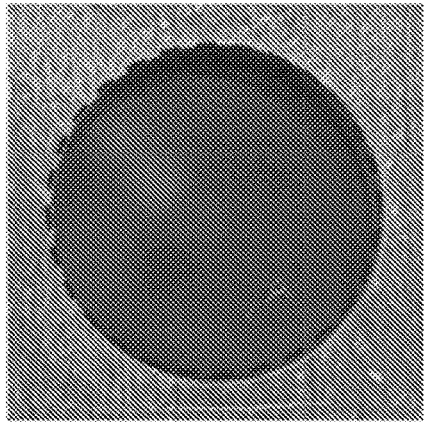
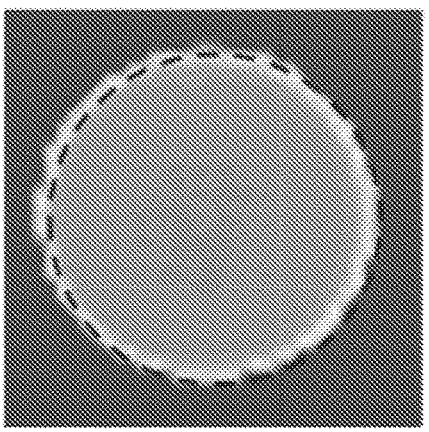
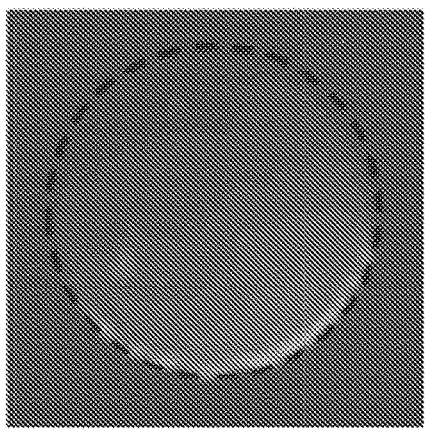
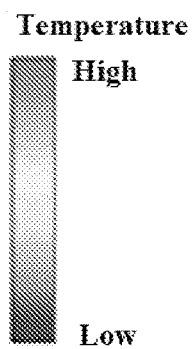
POLYURETHANE PAINT    3-DIMENSIONAL RESONANT STRUCTURE-BASED INFRARED SELECTIVE EMITTER
FIG. 9

US 12,535,629 B2

3-DIMENSIONAL RESONANT STRUCTURE BASED INFRARED SELECTIVE EMITTER CAPABLE OF BROADBAND AND INCREASED EMISSION

CROSS REFERENCE TO RELATED APPLICATION

The present application claims priority to Korean Patent Application No. 10-2022-0042101, filed on Apr. 5, 2022, the entire contents of which is incorporated herein for all purposes by this reference.

BACKGROUND OF THE INVENTION

Field of the Invention

The present invention relates to a 3-dimensional resonant structure-based infrared selective emitter capable of broadband and high emissivity, and more particularly, an infrared selective emitter and manufacturing method thereof that is capable of maximizing the infrared selective emission function by broadening the emissivity in the non-detection band with resonance phenomena between multiple resonator units at the same time as securing infrared camouflage and energy dissipation-resultant surface thermal stability by reducing the emissivity significantly in the infrared detection band and selectively dissipating energy to the non-detection bands, by using the 3-dimensional resonant structure-based infrared selective emitter.

Description of the Related Art

Stealth technology refers to the techniques used to minimize the detection of signals by the target. Recently, infrared technology has been widely used along with acoustic signals to detect submarines as a target detection method. Accordingly, in order to minimize these various detection signals, various stealth technologies are being studied.

In particular, to avoid detection by infrared detectors that detect signals in the mid-infrared band (3 to 5 μm) and far-infrared band (8 to 12 μm) that are not absorbed in the atmospheric absorption band (5 to 8 μm) among the infrared signals generated from the signal source, there has been introduced a technology that radiates infrared by designing the surface emissivity to be high in the wavelength band (5 to 8 μm) with low atmospheric transmittance and low in the atmospheric window region (3 to 5 μm and 8 to 14 μm) with high atmospheric transmittance by lowering the temperature of the radiating surface or changing the surface structure.

However, the conventionally introduced infrared selective emitters have a limitation in that the amount of heat dissipation to the non-detection band (atmospheric absorption band) is low because their resonant structure is composed of a single diameter structure, which causes the resonance phenomenon only in one wavelength band. In more detail, considering, to avoid detection by infrared detectors, the necessity of securing the thermal stability of the surface itself by selectively radiating energy to the atmospheric absorption band, which is a band that infrared detectors cannot detect, and furthermore recently developed weapons systems requiring higher heat dissipation capabilities for thermal equilibrium due to high-speed flight-induced aerodynamic heating or high heat loads from engines, the infrared selective emitters complying with the conventional technology have limitations in practical applications because they cannot maximize infrared signals by broadening the emissivity in specific wavelength bands, not just selectively radiating infrared in specific wavelength bands.

Therefore, there is an urgent need for research on infrared selective emitters capable of maximizing infrared selective emission function by broadening the emissivity in the non-detection band with the resonance phenomenon between multiple resonator units at the same time as securing infrared camouflage and energy dissipation-resultant surface thermal stability by selectively dissipating energy to the non-detection bands.

Documents of Related Art

Patent Document 1

SUMMARY OF THE INVENTION

The present invention has been conceived to solve the above problems, and it is an object of the present invention to provide an infrared selective emitter and manufacturing method thereof that is capable of maximizing the infrared selective emission function by broadening the emissivity in the non-detection bands with resonance phenomena between multiple resonator units at the same time as securing infrared camouflage and energy dissipation-resultant surface thermal stability by reducing the emissivity significantly in the infrared detection band and selectively dissipating energy to the non-detection bands, by using the 3-dimensional resonant structure-based infrared selective emitter.

The objects to be achieved by the present invention are not limited to the aforesaid, and other objects not described herein with be clearly understood by those skilled in the art from the descriptions below.

In order to solve the above problems, the present invention provides an infrared selective emitter including a flat portion formed by stacking a metal layer and a dielectric layer and a pattern portion comprising a plurality of resonance structures of which each formed by staking metal and dielectric layers alternately to have the topmost and bottommost layers being the metal layer and which include at least two types different in at least one of shape and cross-section perpendicular to a stacking direction and arranged in a predetermined pattern.

In addition, according to an embodiment of the present invention, the infrared selective emitter may include at least two resonator units formed by continuously stacking a metal layer, a dielectric layer, and a metal layer from the metal layer of the flat portion to the topmost layer of the resonant structures.

In addition, the plurality of the resonant structures may include two types of resonant structures different in size of a cross-section perpendicular to the stacking direction, and the two types of resonant structures may be arranged alternately in a mutually perpendicular x-axis and y-axis direction of the flat portion.

In addition, the plurality of resonant structures may have a cross-section decreasing in size as going up to the top layer in a height direction.

In addition, an end face shape parallel to the stacking direction of each layer constituting the plurality of resonant structure may be a trapezoidal shape.

In addition, the plurality of resonant structures may have a diameter of 0.1 to 10 μm and may be arranged to have a spacing of 0.1 to 10 μm on the flat portion.

In addition, the metal layers of the plurality of resonant structures may have a thickness of 10 to 500 nm and the dielectric layers of the plurality of resonant structures may have a thickness of 10 to 1000 nm.

In addition, the infrared selective emitter may have a heat dissipation ratio of 45 to 70% that is calculated by Equation 1:

$$\text{Heat dissipation ratio (\%)} = \frac{E_s(T)@5-8\ \mu m}{E_{BB}(T)@5-8\ \mu m}$$

where E is radiant energy, T is temperature, subscript s is selective emitter, and BB is black body.

In addition, the infrared selective emitter may have a maximum emissivity of 0.8 or higher in the infrared wavelength band of 5 to 8 μm.

In addition, the present invention provides a method of manufacturing an infrared selective emitter, the method including (1) stacking a metal layer and a dielectric layer alternately on a substrate to have the topmost and bottommost layers being the metal layers, (2) forming a mask pattern layer on the topmost metal layer, and (3) forming a pattern portion comprising resonant structures formed by etching the alternately stacked metal and dielectric layers in a predetermined pattern, along with a flat portion formed by stacking a metal layer and a dielectric layer, on the dielectric layer of the flat portion.

In addition, etching in step (4) may include isotropic etching.

BRIEF DESCRIPTION OF THE DRAWINGS

FIG. 6 is a table showing the heat dissipation rates of an infrared selective emitter measured using Fourier Transform Infrared (FT-IR);

FIG. 9 is an image showing a sample placed on a hotplate heated to 370K for comparison between an embodiment of the present invention and polyurethane paint.

DETAILED DESCRIPTION OF THE INVENTION

Figure 1:
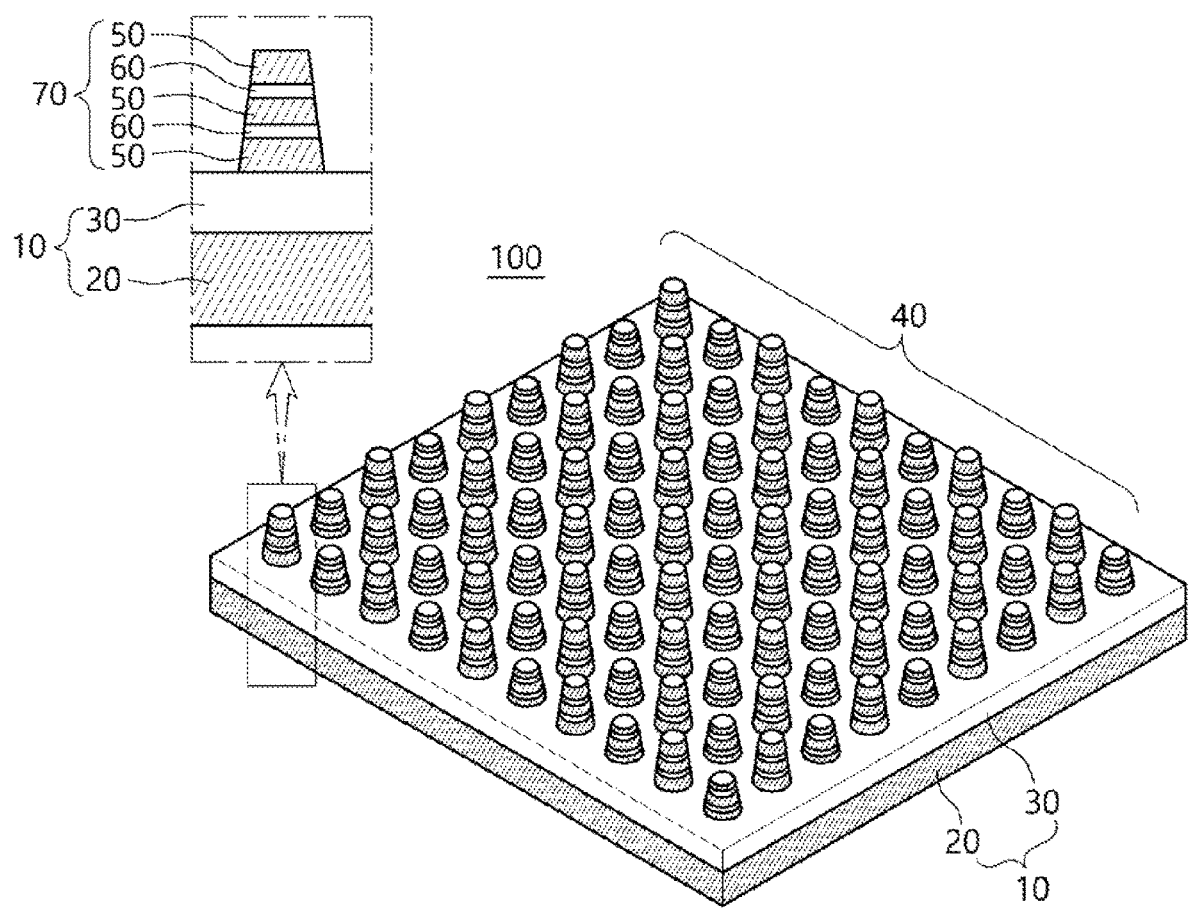
FIG. 1 is a perspective view illustrating an infrared selective emitter according to the present invention.

Hereafter, the preferred embodiments of the present invention, which are capable of achieving the above-described objects, will be described with reference to the accompanying drawings. Throughout the description of the embodiments, the same names and reference numerals may be used to refer to the same components, and additional explanations may be omitted accordingly.

As described above, the conventional infrared selective emitter has a limitation in its practical application to infrared camouflage materials due to the problem that it cannot maximize the emissivity in the non-detection band.

Accordingly, the present invention provides an infrared selective emitter including a flat portion formed by stacking a metal layer and a dielectric layer and a pattern portion formed with a plurality of resonance structures of which each is formed by stacking a metal layer and a dielectric layer alternately to have the top and bottom layers being the metal layer 50 and which include at least two types different in at least one of shape and cross-section perpendicular to the stacking direction and arranged in a predetermined pattern on the dielectric pattern of the flat portion 10.

Through this configuration, the present invention is capable of maximizing the infrared selective emission function by broadening the emissivity in the non-detection bands with resonance phenomena between multiple resonator units at the same time as securing infrared camouflage and energy dissipation-resultant surface thermal stability by reducing the emissivity significantly in the infrared detection band and selectively dissipating energy to the non-detection bands, by using the 3-dimensional resonant structure-based infrared selective emitter.

Hereinafter, a description is made of the infrared selective emitter according to the present invention in detail with reference to accompanying drawings.

With reference to FIG. 1, the infrared selective emitter 100 according to the present invention includes a flat portion 10 formed stacking a metal layer 20 and a dielectric layer 30 and a pattern portion 40 formed with a plurality of resonance structures 70 of which each is formed by stacking a metal layer 50 and a dielectric layer 60 alternately to have the top and bottom layers being the metal layer 50 and which include at least two types different in at least one of shape and cross-section perpendicular to the stacking direction and are arranged in a predetermined pattern on the dielectric layer 30 of the flat portion 10.

The flat portion 10 serves as a structural support physically supporting the infrared selective emitter 100 according to the present invention and may have a flat plate structure formed by stacking the metal layer 20 and the dielectric layer 30.

The metal layer 20 may be formed of a material commonly known to be suitable for the purpose of the present invention with a predetermined thickness without impeding the selective radiation and heat dissipation of the infrared selective emitter 100, and examples of the material may include, but are not limited to, gold (Au), silver (Ag), copper (Cu), and lead (Pt). According to a preferred embodiment of the present invention, when being implemented with gold, the metal layer 20 may have a thickness of 10 to 500 nm.

The dielectric layer 30 is formed on the top surface of the metal layer 20 and provides a surface for the pattern portion 40 in which the plurality of resonant structures 70 to be described later are formed. The dielectric layer 30 may be formed of a dielectric material, which is polarized with negative charges for positive charges and positive charges for negative charges without conducting electricity and commonly known to be suitable for the purpose of the present invention, with a predetermined thickness without impeding the selective radiation and heat dissipation of the infrared selective emitter 100. Examples of the dielectric material may include, but are not limited to, $MgF_2$, ZnS, AlN, $Al_2O_3$, $SiO_2$, and $Si_3N_4$, and when the metal layer 20 is implemented with gold according to a preferred embodiment of the present invention, the dielectric layer 30 may have a thickness of 10 to 1000 nm.

In addition, the infrared selective emitter 100 according to the present invention includes the pattern portion 40 arranged in a predetermined pattern on the dielectric layer 30 of the flat portion 10.

To avoid detection by infrared detectors that detect signals in the mid-infrared band (3 to 5 μm) and far-infrared band (8 to 12 μm) that are not absorbed in the atmospheric absorption band (5 to 8 μm) among the infrared signals generated from the signal source, it is possible to selectively emit infrared by designing the surface emissivity to be high in the wavelength band (5 to 8 μm) with low atmospheric transmittance and low in the atmospheric window region (3 to 5 μm and 8-14 μm) with high atmospheric transmittance by lowering the temperature of the radiating surface or changing the surface structure. However, the existing infrared selective emitters have a limitation in that the amount of heat dissipation to the non-detection band (atmospheric absorption band) is low because their resonant structure is composed of a single diameter structure, which causes the resonance phenomenon only in one wavelength band. That is, considering, to avoid detection by infrared detectors, the necessity of securing the thermal stability of the surface itself by selectively radiating energy to the atmospheric absorption band, which is a band that infrared detectors cannot detect, and furthermore recently developed weapons systems requiring higher heat dissipation capabilities for thermal equilibrium due to high-speed flight-induced aerodynamic heating or high heat loads from engines, the infrared selective emitters complying with the conventional technology have limitations in practical applications because they cannot maximize infrared signals by broadening the emissivity in specific wavelength bands, not just selectively radiating infrared in specific wavelength bands.

The present invention is capable of maximizing the infrared selective radiation function by broadening the emissivity in the non-detection bands with resonance phenomena between multiple resonator units at the same time as securing infrared camouflage and energy dissipation-resultant surface thermal stability by reducing the emissivity significantly in the infrared detection band and selectively dissipating energy to the non-detection bands, by using the 3-dimensional resonant structure-based infrared selective emitter.

For this purpose, the pattern portion 40 is composed of a plurality of resonance structures 70 of which each is formed by stacking a metal layer 50 and a dielectric layer 60 alternately to have the topmost and bottommost layers being the metal layer 50 and which include at least two types different in at least one of shape and cross-section perpendicular to the stacking direction and are arranged in a predetermined pattern.

Figure 2:
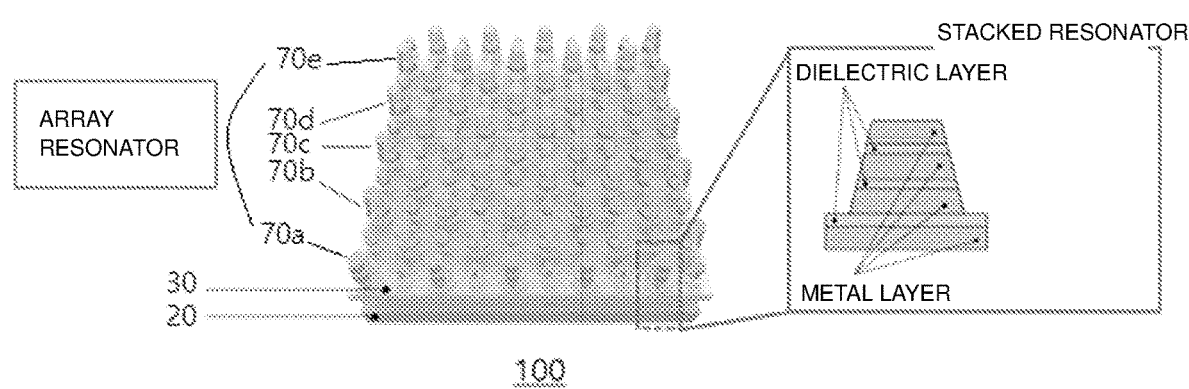
FIG. 2 is a diagram illustrating an array resonator and a stacked resonator according to the present invention.

In more detail, with reference to FIG. 2, the infrared selective emitter 100 according to the present invention may be implemented by combining an array resonator implemented in the x-y plane of the pattern portion 40 and a stacked resonator implemented in the stacking direction of the resonant structures 70.

The array resonator is formed by arranging resonant structures 60 at predetermined intervals on the top of the dielectric layer 30 to form the pattern portion 40. Here, the plurality of resonant structures 70 constituting the array resonator include two types of resonant structures 70 with different sizes in the cross-section perpendicular to the stacking direction, and the two types of resonant structures 70 may be alternately arranged in the x and y directions perpendicular to each other on the top surface of the dielectric layer 30.

Here, the cross-section perpendicular to the stacking direction of the plurality of resonant structures 70 may vary in shape, such as circular, elliptical, or polygonal shapes, and moreover, some or all of the cross-sections perpendicular to the stacking direction of the plurality of resonant structures 70 may have different shapes and sizes and may be suitably designed to achieve the objects of the present invention.

That is, as shown in FIG. 2, according to an embodiment of the present invention, the array radiator of the infrared selective emitter 100 according to an embodiment of the present invention is composed of the pattern portion 40, which may be formed with the first to fifth resonant structures 70a to 70e arranged at predetermined intervals on the dielectric layer 30, the first and second resonant structures 70a and 702 being different in size and, preferably, diameter D1 of the circular cross-section perpendicular to the stacking direction of the first resonant structure 70a being 1.1 to 5 times larger than the diameter D2 of the circular cross-section perpendicular to the stacking direction of the second resonant structure 70b.

Figure 3:
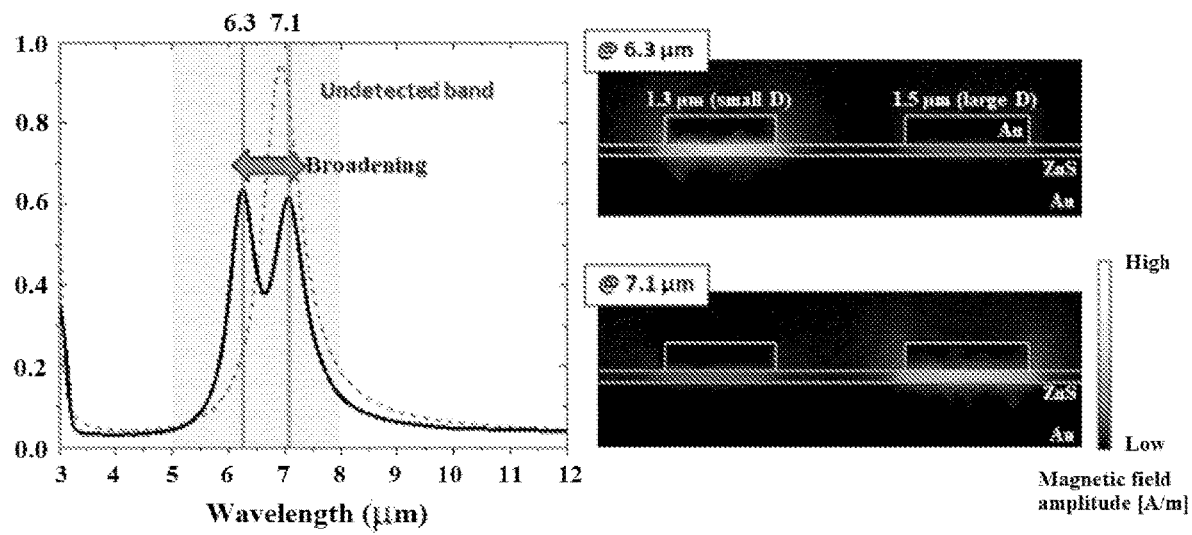
FIG. 3 is a graph showing the emissivity when an array resonator is implemented with resonator units of different sizes according to an embodiment of the present invention.

With reference to FIG. 3, it can be observed that using the array resonators with different sizes according to an embodiment of the present invention makes it possible to broaden the emissivity in the non-detection band by implementing the resonant structures 60 of which the first resonant structure 70a has the diameter of 1.3 μm and the second resonant structure 70b has the diameter of 1.5 μm.

When the diameter D1 of the circular cross-section perpendicular to the stacking direction of the first resonant structure 70a is less than 1.1 times the diameter D2 of the circular cross-section perpendicular to the stacking direction of the second resonant structure 70b, it may be difficult to maximize the selective infrared camouflage performance through broadening the bandwidth in the specific band as intended by the present invention; when the diameter D1 of the circular cross-section perpendicular to the stacking direction of the first resonant structure 70a exceeds 5 times the diameter D2 of the circular cross-section perpendicular to the stacking direction of the second resonant structure 70b, the size difference between the resonant structures 70 may become too large, which may be disadvantageous for selective infrared emission.

According to another embodiment of the present invention, the end face shape parallel to the stacking direction of each layer constituting each of the plurality of resonant structures 70 of the array resonator of the selective infrared emitter 100 may have various shapes such as circular, elliptical, polygonal, and the like, and preferably may have a trapezoidal shape. In more detail, the first resonant structure 70a and the second resonant structure 70b may be arranged on the dielectric layer 30 at predetermined intervals to form the pattern portion 40, and in this case, the end face parallel to the stacking direction of each layer constituting the first resonant structure 70a and the second resonant structure 70b may have a trapezoidal shape that decreases in size from the lower layer to the upper layer using isotropic etching process in a top-down manner. The resonant structure 70 configured in this manner may be more advantageous than an infrared selective emitter formed in a single shape in terms of broader bandwidth emission in the atmospheric absorption band where the infrared detectors cannot detect and in terms of selective infrared radiation due to more energy emission.

In addition, each of the resonant structures 70 constituting the array resonator may be alternately arranged in a mutually perpendicular x-axis and y-axis direction with a spacing of 0.1 to 10 μm on the dielectric layer 30 to form the pattern portion 40. When the spacing between the resonant structures 70 is less than 0.1 μm, it may be difficult to broaden the emissivity in the non-detection band (5 to 8 μm); when the spacing between the resonant structures 70 exceeds 10 μm, it may be difficult to increase the emissivity in the non-detection band (5 to 8 μm).

The stacked resonator implemented in the stacking direction of the resonant structures 70 constituting the pattern portion 40 according to the present invention may be formed by stacking different resonator units 75 and, according to an embodiment of the present invention, the plurality of resonant structures 70 may be implemented such that the size of the cross-sectional area in the height direction decreases as it goes up to the top layer.

Figure 4:
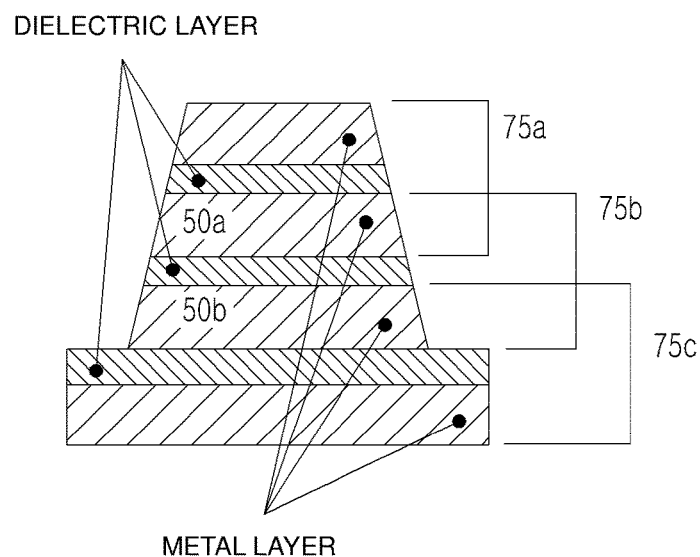
FIG. 4 is a diagram illustrating a resonator unit for a stacked resonator according to an embodiment of the present invention.

In more detail, the stacked resonator of the infrared selective emitter 100 according to the present invention may be implemented with at least two resonator units 75 composed of a metal layer, dielectric layer, and metal layer that are continuously stacked from the metal layer 20 of the flat portion 10 to the top layer of the resonant structure 70, as shown in FIG. 4. For example, from the top layer of the resonant structures 70 to the metal layer 20 of the flat portion 10, the first resonator unit 75*a*, the second resonator unit 75*b*, and the third resonator unit 75*c* may be continuously stacked, and the adjacent resonator units 75 may be stacked by sharing a metal layer 50.

That is, as shown in FIG. 4, the first resonator unit 75*a* and the second resonator unit 75*b* may be stacked by sharing a metal layer 50*a*, and the second resonator unit 75*b* and the third resonator unit 75*c* may be stacked by sharing a metal layer 50*b*.

In this case, it may be advantageous to broaden and maximize the emissivity in a specific band compared to the case where only the array resonator is used to implement the pattern portion 40. In more detail, with reference to FIG. 5, it can be observed that the emissivity increases significantly in the non-detection band when the first and second resonant structures 70*a* and 70*b* with different diameters to each include the first resonator unit 75*a* and the second resonator unit 75*b*. That is, compared to the case of using the infrared selective emitter formed with the metal pattern having a single diameter, the present invention is cable of increasing the amount of energy emission in the non-detection band, i.e., atmospheric absorption band, where the infrared detectors cannot perform detection, and improving the camouflage performance with almost no absorption and radiation due to no occurrence of resonance in the detection band, by adjusting the diameter of the resonator units constituting the array resonator, the number of the resonator units with different sizes, and the number of resonator units.

As described above, the present invention is capable of maximizing the infrared selective radiation function by broadening the emissivity in the non-detection bands with resonance phenomena between multiple resonator units at the same time as securing infrared camouflage and energy dissipation-resultant surface thermal stability by reducing the emissivity significantly in the infrared detection band and selectively dissipating energy to the non-detection bands, by using the plurality of three-dimensional resonant structures 70 implemented in the form of array resonators and stacked resonators.

That is, the infrared selective emitter 100 according to the present invention may have a maximum emissivity of 0.8 or more in the 5 to 8 μm infrared wavelength range, and the heat dissipation ratio calculated through Equation 1 may be between 45 to 70%.

$$\text{Heat dissipation ratio (\%)} = \frac{E_s(T)@5-8\ \mu m}{E_{BB}(T)@5-8\ \mu m} \quad \text{Equation 1}$$

where E is radiant energy, T is temperature, subscript s is selective emitter, and BB is black body.

Using Equation 1, it is possible to compare the heat dissipation ratio between the conventional infrared selective emitter with a single diameter structure and the infrared selective emitter according to the present invention having a 3-dimensional resonant structure for surface temperatures ranging from 200K to 1000K. With reference to FIG. 6, it can be seen that the infrared selective emitter according to the present invention having a 3-dimensional resonant structure exhibits significantly superior heat dissipation compared to the conventional infrared selective emitter with the same temperature.

Thus, in order to secure infrared camouflage through selective energy dissipation to the non-detection band and energy dissipation-resultant surface thermal stability, and at the same time, to maximize the infrared selective radiation function by broadening the emissivity in the non-detection band using the resonance phenomenon between multiple resonator units, the multiple resonant structures 70 of the infrared selective emitter 100 according to the present invention may have diameters ranging from 0.1 to 10 and preferably from 1.2 to 1.8 μm. Here, when the diameter of the resonance structures 70 is less than 0.1 μm, it may be difficult to reduce the infrared signal of the detection band (3 to 5 μm); when the diameter of the resonance structures 70 exceeds 10 μm, it may be difficult to reduce the infrared signal of the detection band (8 to 12 μm).

In addition, the thickness of the metal layer 50 constituting the plurality of resonant structures 70 may be 10 to 500 nm, and preferably, 100 to 200 nm. Here, when the thickness of the metal layer 50 is less than 10 nm, this may cause a problem in that the infrared selective radiation phenomenon gradually disappears, making it impossible to broaden the emissivity and achieve high emissivity; when the thickness of the metal layer 50 exceeds 500 nm, this may increase the weight of the precious metal required for fabrication, leading to an increase in the weight of the overall material and production costs.

In addition, the thickness of the dielectric layer 60 of the plurality of resonant structures 70 may be 10 to 1000 nm, and preferably, 100 to 300 nm. Here, when the thickness of the dielectric layer 60 is less than 10 nm or exceeds 1000 nm, this may cause a problem in that the infrared selective radiation phenomenon gradually disappears, making it impossible to broaden the emissivity and achieve high emissivity.

Hereinafter, a description is made of the method of manufacturing the infrared selective radiator 100 according to the present invention with reference to FIG. 7. However, in order to avoid redundancy, the description of parts with the same technical concept as the above-described infrared selective radiator 100 will be omitted.

The method of manufacturing an infrared selective radiator according to the present invention includes steps of (1) stacking a metal layer and a dielectric layer alternately so that the topmost and bottommost layers are metal layers, as described above, (2) forming a mask pattern layer having a predetermined gap on the topmost metal layer, and (3) forming the pattern portion having resonant structures formed therein with the alternately stacked metal and dielectric layers, on the dielectric layer of the flat portion, in a predetermined pattern along with the flat portion formed by stacking the dielectric layer and the metal layer, by etching through the mask pattern layer.

Step (1) involves stacking the metal and dielectric layers alternately on a substrate so that the topmost and bottommost layers are metal layers.

Figure 8:
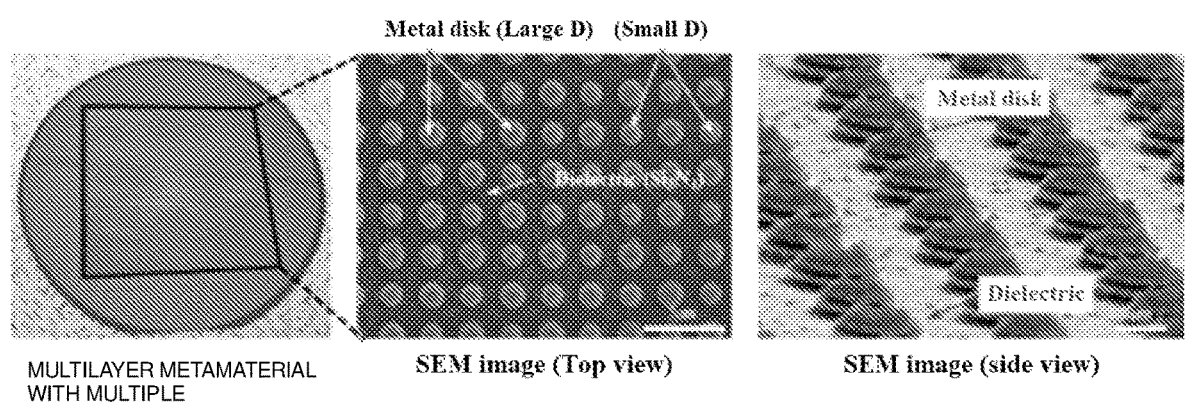
FIG. 8 is an SEM image of the infrared selective emitter according to the present invention.

In more detail, with reference to FIG. 8, step (1) includes depositing the metal and dielectric layers alternately on the substrate of the infrared selective radiator 100 of the present invention so that the topmost and bottommost layers are metal layers. Here, the deposition may be carried out using commonly known deposition methods suitable for the purpose of the present invention, such as physical or chemical deposition. Physical deposition or chemical deposition methods may include direct current (DC) sputtering, magnetron sputtering, electron beam evaporation, thermal evaporation, laser molecular beam epitaxy (LMBE), pulsed laser deposition (PLD), vacuum deposition, atomic layer deposition (ALD), or plasma-enhanced chemical vapor deposition (PECVD).

Next, step (2) involves forming a mask pattern layer having a predetermined gap on the topmost metal layer. The mask pattern layer may be formed by a commonly known method suitable for the purpose of the present invention, but preferably, formed by coating a photoresist (PR) on the metal layer and applying UV exposure to create a pattern of gaps spaced apart at a predetermined interval.

Next, step (3) involves forming the pattern portion having resonant structures formed therein with the alternately stacked metal and dielectric layers, on the dielectric layer of the flat portion, in a predetermined pattern along with the flat portion formed by stacking the dielectric layer and the metal layer, by etching through the mask pattern layer.

Step (3) is of removing the portion not covered by the mask pattern layer to create a resonant structure with the metal and dielectric layers below the mask pattern layer in a predetermined pattern along with the flat portion formed by stacking the metal layer and the dielectric layer. The method of removing the portion where the mask pattern layer is not formed is not specifically limited as long as it is a commonly used method in the field and does not damage the structure of the stacked insulation layer and a metal layer, and preferably, the three-dimensional resonant structures are formed in the shape of a trapezoid with increasing size from the top layer to the bottom layer by isotropic etching and stripping off the photoresist.

The following embodiments are provided to further illustrate the present invention, but are not intended to limit the scope thereof, and should be interpreted as being for the purpose of aiding in the understanding of the present invention.

Embodiment 1—Manufacturing of Infrared Selective Emitter

Figure 7:
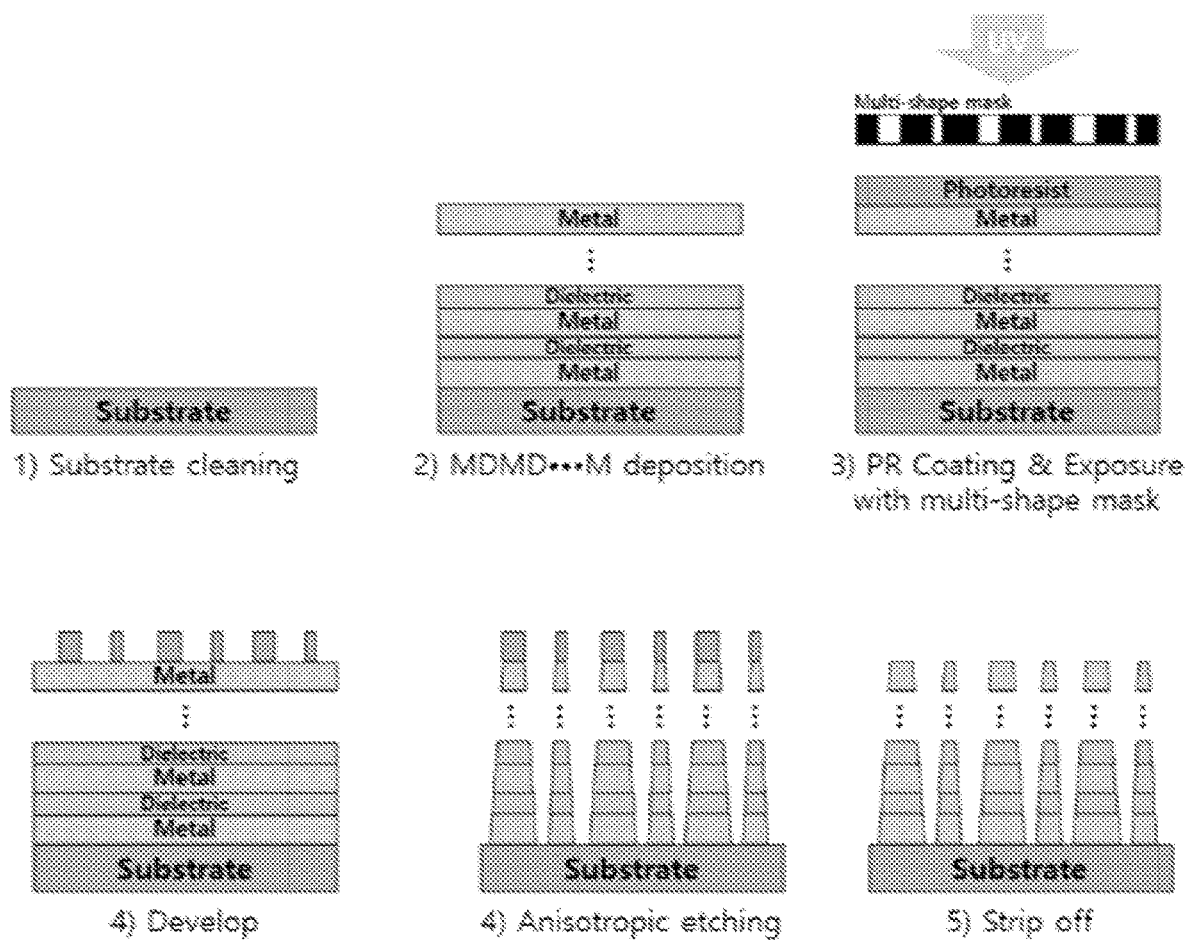
FIG. 7 is a diagram illustrating a method for manufacturing an infrared selective emitter according to the present invention.

Metal layers of Gold (Au) with a thickness of 100 nm and dielectric layers of zinc sulfide (ZnS) with a thickness of 200 nm were deposited on a silicon wafer using an E-beam evaporator, PECVD, and E-beam evaporator, in the order as shown in FIG. 7.

Next, a mask pattern layer, on the previously manufactured layered structure, to two circular patterns with diameters of 1.3 μm and 1.5 μm.

Afterward, the stacked structure was thy-etched using an Induced Coupled Plasma (ICP) etcher in a top-down manner, using the previously formed mask pattern layer to etch the areas where the mask pattern layer was not formed; then a flat portion was formed with a metal layer of 100 nm thickness of Gold (Au) and a dielectric layer of 200 nm thickness of zinc sulfide (ZnS); the infrared selective emitter was obtained so as to include a pattern portion formed by arranging first and second resonant structures with a spacing of 3 μm on the flat portion formed by stacking the metal and dielectric layers with thicknesses of 100 nm and 200 nm, the first resonant structures including a first metal layer with a thickness of 100 nm and a diameter of 1.3 μm, a first dielectric layer with a thickness of 200 nm and a diameter of 1.2 μm, a second metal layer with a thickness of 100 nm and a diameter of 1.15 μm, a second dielectric layer with a thickness of 200 nm and a diameter of 1.05 μm, and a third metal layer with a thickness of 100 nm and a diameter of 1.0 μm, and the second resonant structures including a first metal layer with a thickness of 100 nm and a diameter of 1.5 um, a first dielectric layer with a thickness of 200 nm and a diameter of 1.4 um, a second metal layer with a thickness of 100 nm and a diameter of 1.35 um, a second dielectric layer with a thickness of 200 nm and a diameter of 1.25 um, and a third metal layer with a thickness of 100 nm and a diameter of 1.2 um.

Embodiments 2 and 3—Manufacturing of Infrared Selective Emitter

The infrared selective emitter was manufactured by following the same process as embodiment 1, but with a different number of layers in the stacked resonator.

Embodiments 4 to 11—Manufacturing of Infrared Selective Emitter

The infrared selective emitter was fabricated by following the same process as embodiment 1, but with variations in the thickness of the dielectric layer, thickness of the metal layer, and diameter of the metal layer.

Comparative Example 1—Manufacturing of Infrared Selective Emitter

The conventional infrared selective emitter was manufactured by following the same process as in embodiment 1, but with the resonant structures having a uniform diameter of 1.8 um and manufactured as a single layer.

TABLE 1

|  | Thickness of metal layer (nm) | Thickness of dielectric layer (nm) | Thickness of metal structure (nm) | Number of layers in stacked resonator (piece) | Pitch of metal structure (μm) | Diameter of bottom metal of stacked resonator 1 (μm) | Diameter of bottom metal of stacked resonator 2 (μm) |
|---|---|---|---|---|---|---|---|
| Embodiment 1 | 100 | 200 | 100 | 2 | 3 | 1.3 | 1.5 |
| Embodiment 2 | 100 | 200 | 100 | 1 | 3 | 1.3 | 1.5 |
| Embodiment 3 | 100 | 200 | 100 | 3 | 3 | 1.3 | 1.5 |
| Embodiment 4 | 100 | 200 | 100 | 2 | 3 | 1.2 | 1.4 |
| Embodiment 5 | 100 | 200 | 100 | 2 | 3 | 1.5 | 1.7 |
| Embodiment 6 | 100 | 200 | 100 | 2 | 3 | 1.8 | 2.0 |
| Embodiment 7 | 100 | 200 | 100 | 2 | 2 | 1.2 | 1.4 |
| Embodiment 8 | 100 | 200 | 100 | 2 | 4 | 1.2 | 1.4 |
| Embodiment 9 | 100 | 100 | 100 | 2 | 3 | 1.2 | 1.4 |
| Embodiment 10 | 100 | 300 | 100 | 2 | 3 | 1.2 | 1.4 |
| Embodiment 11 | 200 | 200 | 200 | 2 | 3 | 1.2 | 1.4 |
| Comparative Example 1 | 100 | 200 | 100 | 1 | 3 | 1.8 | |

Experiment Example 1—SEM Image

The infrared selective emitter manufactured according to Embodiment 1 was observed using a Scanning Electron Microscope (SEM) and is shown in FIG. 9.

With reference to FIG. 8, it can be seen from the SEM images that the resonant structures consisting of metal-dielectric-metal layers, with decreasing size from the bottom to the top layer, are well-formed.

Experiment Example 2—Visual and Infrared Images

To confirm the infrared stealth performance of the infrared selective emitter manufactured according to Embodiment 1, a sample of polyurethane paint (emissivity of 0.78) used for surface coating of aircraft and other surfaces was placed on a hot plate heated to 370K, and infrared images were compared and are shown in FIG. 9.

With reference to FIG. 9, it can be seen that the polyurethane paint radiates a high infrared signal and is exposed to an infrared detector, while in the case of Embodiment 1 of the present invention, it exhibits an infrared stealth effect by radiating a signal similar to the surrounding background.

Experiment Example 3—Measurement of Heat Dissipation Rate

The infrared selective emitters manufactured according to Embodiment 1 and Comparative Example 1 were measured for heat dissipation rate using Fourier Transform Infrared (FT-IR) spectroscopy, and the results are shown in FIG. 6 and Table 2 below.

With reference to FIG. 6, it can be seen that the heat dissipation rate of Embodiment 1 of the present invention with the three-dimensional resonant structures is higher than that of Comparative Example 1 at the same temperature. With reference to Table 2, it can be seen that the selective infrared emitters according to the embodiments of the present invention exhibit different heat dissipation rates under each temperature condition, indicating that the methodology provided by the present invention allow for the design of selective infrared emitters to meet specific environments and applications by controlling variables such as the thickness of the dielectric layer, the thickness of the metal layer, and the metal diameter.

TABLE 2

| Heat dissipation rate per unit of blackbody energy | @300 K (%) | @400 K (%) | @500 K (%) | @600 K (%) | @700 K (%) | @800 K (%) | @900 K (%) | @1000 K (%) |
|---|---|---|---|---|---|---|---|---|
| Embodiment 1 | 51.22 | 57.04 | 59.09 | 59.82 | 60.08 | 60.15 | 60.14 | 60.1 |
| Embodiment 2 | 32.95 | 33.75 | 33 | 32.12 | 31.38 | 30.79 | 30.33 | 29.96 |
| Embodiment 3 | 54.52 | 59.33 | 60.46 | 60.53 | 60.3 | 60.02 | 59.75 | 59.51 |
| Embodiment 4 | 6.56 | 11.38 | 15.05 | 17.59 | 19.36 | 20.64 | 21.59 | 22.31 |
| Embodiment 5 | 30.11 | 39.65 | 44.71 | 47.57 | 49.34 | 50.5 | 51.3 | 51.89 |
| Embodiment 6 | 66.23 | 57.9 | 52.09 | 48.24 | 45.62 | 43.77 | 42.41 | 41.38 |

Experimental Example 4—Measurement of Emissivity

Figure 5:
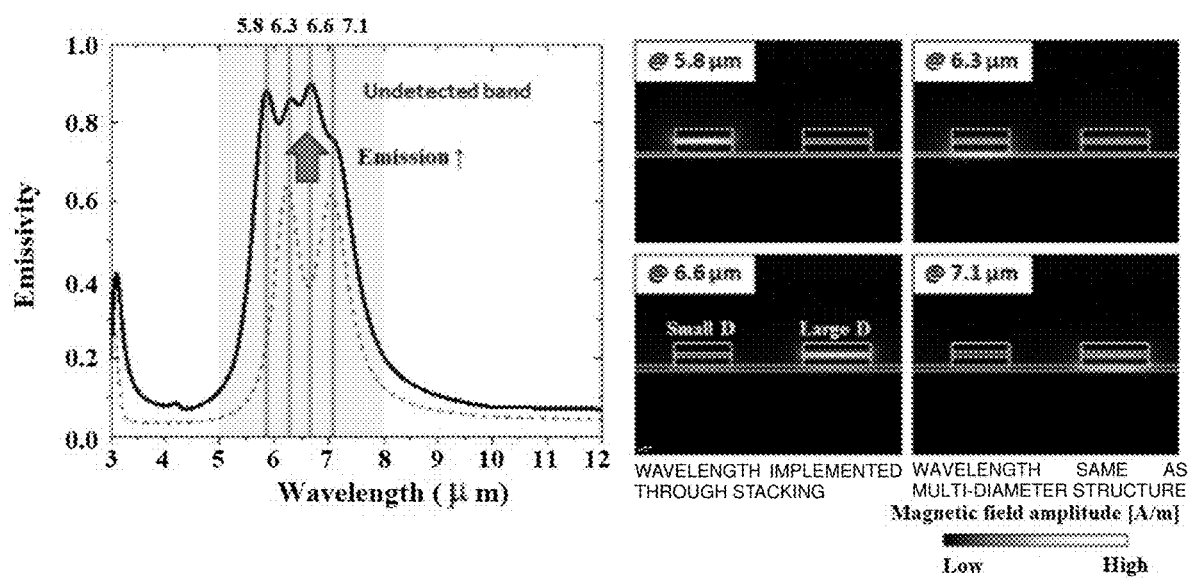
FIG. 5 is a graph showing the emissivity of an infrared selective emitter with a 3-dimensional resonant structure combining an array resonator and a stacked resonator according to an embodiment of the present invention.

Using Fourier Transform Infrared (FT-IR) equipment, the infrared emission spectrum and emissivity were measured for Embodiments 1 and 2 and Comparative Example 1, and the results are shown in FIGS. 3 and 5, respectively.

With reference to FIG. 3, it can be seen that the non-detection band emissivity can be broadened by implementing the resonant structures 70 to have different sizes, the first resonant structure 70a having a diameter of 1.3 μm and the second resonant structure 70b having a diameter of 1.5 μm.

With reference to FIG. 5, it can also be seen that the non-detection band emissivity can be significantly increased by implementing the first resonant structure 70a and the second resonant structure 70b with different diameters to have a first resonator unit 75a and a second resonator unit 75b, respectively. That is, by adjusting the diameter of the resonator units constituting the array resonator, the number of the resonator units with different sizes, and the number of the resonator units, the present invention is cable of increasing the amount of energy emission significantly in the non-detection band, i.e., atmospheric absorption band, where the infrared detectors cannot perform detection, and improving camouflage performance with almost no absorption and radiation due to no occurrence of resonance in the detection band.

The present invention is capable of maximizing the infrared selective radiation function by broadening the radiation bandwidth in the non-detection bands with resonance phenomena between multiple resonator units at the same time as securing infrared camouflage and energy dissipation-based surface thermal stability by reducing the emissivity significantly in the infrared detection band and dissipating energy to the non-detection bands, by using the 3-dimensional resonant structure-based infrared selective emitter.

It should be understood that the advantages of the present invention are not limited to the aforesaid but include all advantages that can be inferred from the detailed description of the present invention or the configuration specified in the claims.

Although preferred embodiments of the present invention have been described with reference to the drawings, but those skilled in the art may variously modify or change the present invention without departing from the spirit of the invention and scope of the appended claims.

What is claimed is:

1. An infrared selective emitter comprising:
a flat portion including a first metal layer and a first dielectric layer disposed on the first metal layer; and
a pattern portion including a plurality of resonance structures,
wherein each of the plurality of resonance structures includes second metal layers and at least one second dielectric layer alternately stacked on each other,
wherein a topmost layer and a bottommost layer of each of the plurality of resonance structures are the second metal layers,
wherein the plurality of resonance structures includes:
first resonance structures; and
second resonance structures, the first resonance structures and the second resonance structures being different from each other in at least one of shape and cross-section perpendicular to a stacking direction of each of the plurality of resonance structures, the plurality of resonance structures being arranged in a predetermined pattern,
wherein the first resonance structures and the second resonance structures are arranged alternately along an x-axis of the flat portion, each first resonance structure being spaced apart from each adjacent second resonance structure by a predetermined distance along the x-axis,
wherein the first resonance structures and the second resonance structures are arranged alternately along a y-axis of the flat portion, each first resonance structure being spaced apart from each adjacent second resonance structure by the predetermined distance along the y-axis, the y-axis being perpendicular to the x-axis,.

2. The infrared selective emitter of claim 1,
wherein the flat portion and each of the plurality of resonance structures form at least two resonator units from the first metal layer of the flat portion to the topmost layer of each of the plurality of resonance structures, each resonator unit including a metal layer, a dielectric layer stacked on the metal layer, and another metal layer stacked on the dielectric layer.

3. The infrared selective emitter of claim 1, wherein the first resonance structures and the second resonance structures are different in size of the cross-section perpendicular to the stacking direction.

4. The infrared selective emitter of claim 1, wherein each of the plurality of resonance structures has a cross-section decreasing in size in a height direction as going up toward the topmost layer.

5. The infrared selective emitter of claim 1, wherein shape of a cross-section parallel to the stacking direction of each of the plurality of resonance structures is a trapezoidal shape.

6. The infrared selective emitter of claim 1, wherein the plurality of resonance structures have a diameter of 0.1 to 10 μm, and the predetermined distance is 0.1 to 10 μm.

7. The infrared selective emitter of claim 1, wherein each of the second metal layers of the plurality of resonance structures have a thickness of 10 to 500 nm and each of the at least one second dielectric layer of the plurality of resonance structures have a thickness of 10 to 1000 nm.

8. The infrared selective emitter of claim 1, having a heat dissipation ratio of 45 to 70% according to Equation 1:

$$\text{Heat dissipation ratio (\%)} = \frac{E_s(T)@5-8\ \mu m}{E_{BB}(T)@5-8\ \mu m}$$

where E denotes radiant energy, T denotes temperature, subscript s denotes selective emitter, and subscript BB denotes black body.

9. The infrared selective emitter of claim 1, having a maximum emissivity of 0.8 or higher in an infrared wavelength band of 5 to 8 μm.

10. The infrared selective emitter of claim 1, wherein each of the first metal layer and the second metal layers is one of Au, Ag, Cu, or Pt, and each of the first dielectric layer and the at least one second dielectric layer is one of MgF2, ZnS, AlN, Al2O3, SiO2, or Si3N4.

11. A method of manufacturing an infrared selective emitter, the method comprising:
stacking metal layers and dielectric layers alternately on a substrate to have a topmost layer and a bottommost layer being the metal layers;
forming a mask pattern layer on the topmost layer; and
forming a flat portion by stacking a metal layer and a dielectric layer, and forming a pattern portion including a plurality of resonance structures on the dielectric layer of the flat portion by etching the alternately stacked metal and dielectric layers in a predetermined pattern,
wherein the plurality of resonance structures includes-:
first resonance structures; and
second resonance structures, the first resonance structures and the second resonance structures being different from each other in at least one of shape and cross-section perpendicular to a stacking direction of each of the plurality of resonance structures,
wherein the first resonance structures and the second resonance structures are arranged alternately along an x-axis of the flat portion and spaced apart from each other by a predetermined distance along the x-axis,
wherein the first resonance structures and the second resonance structures are arranged alternately along a y-axis of the flat portion, and spaced apart from each other by the predetermined distance along the y-axis, the y-axis being perpendicular to the x-axis.

12. The method of claim 11, wherein the etching comprises isotropic etching.

* * * * *